United States Patent
Weissbecker et al.

(10) Patent No.: US 10,418,643 B2
(45) Date of Patent: Sep. 17, 2019

(54) BIPOLAR PLATE FOR ELECTROCHEMICAL CELLS AND METHOD FOR THE PRODUCTION THEREOF

(71) Applicant: Forschungszentrum Juelich GmbH, Juelich (DE)

(72) Inventors: Vitali Weissbecker, Aachen (DE); Werner Lehnert, Dueren (DE); Uwe Reimer, Juelich (DE)

(73) Assignee: Forschungszentrum Juelich GmbH, Juelich (DE)

(*) Notice: Subject to any disclaimer, the term of this patent is extended or adjusted under 35 U.S.C. 154(b) by 52 days.

(21) Appl. No.: 15/517,739

(22) PCT Filed: Sep. 17, 2015

(86) PCT No.: PCT/DE2015/000466
§ 371 (c)(1),
(2) Date: Apr. 7, 2017

(87) PCT Pub. No.: WO2016/070862
PCT Pub. Date: May 12, 2016

(65) Prior Publication Data
US 2017/0309925 A1 Oct. 26, 2017

(30) Foreign Application Priority Data
Nov. 3, 2014 (DE) .......................... 10 2014 016 186

(51) Int. Cl.
*C25B 9/04* (2006.01)
*C25B 13/04* (2006.01)
(Continued)

(52) U.S. Cl.
CPC ............. *H01M 8/0202* (2013.01); *C25B 9/04* (2013.01); *C25B 13/04* (2013.01); *H01M 8/021* (2013.01); *H01M 8/0228* (2013.01); *Y02P 70/56* (2015.11)

(58) Field of Classification Search
CPC .................... H01M 8/0202; H01M 8/0228
See application file for complete search history.

(56) References Cited

U.S. PATENT DOCUMENTS

2010/0028749 A1  2/2010  Dadheech et al.
2010/0273095 A1  10/2010  Li et al.
(Continued)

FOREIGN PATENT DOCUMENTS

DE     112013003600 T5    4/2015
GB         2521678 A       7/2015
(Continued)

*Primary Examiner* — Matthew J Merkling
(74) *Attorney, Agent, or Firm* — Norris McLaughlin, P.A.

(57) ABSTRACT

The invention relates to a metallic bipolar plate for use in an electrochemical cell, wherein the bipolar plate comprises an electrically conductive graphene-like coating. The graphene-like coating has a layer thickness between 10 nm and 1 μm. Chemical synthesis is initially carried out to produce the graphene-like coating according to the invention comprising one or more at least partially reduced graphene oxide layers. Proceeding from graphite powder, a graphite oxide powder is initially produced, which is subsequently converted into a stable graphene oxide (GO) suspension by way of ultrasonic dispersion. By depositing this suspension on a metallic carrier substrate (bipolar plate), thin graphene oxide layers can then be applied and subsequently be reduced to obtain at least partially reduced graphene oxide (rGO), which is referred to as graphene-like. This coating advantageously has sufficient stability and the necessary electrical conductivity for use in an electrochemical cell.

8 Claims, 3 Drawing Sheets a)

b)

(51) Int. Cl.
*H01M 8/021* (2016.01)
*H01M 8/0202* (2016.01)
*H01M 8/0228* (2016.01)

(56) References Cited

U.S. PATENT DOCUMENTS

| | | | |
|---|---|---|---|
| 2011/0017585 A1 | 1/2011 | Zhamu et al. | |
| 2011/0227000 A1* | 9/2011 | Ruoff | B82Y 30/00 |
| | | | 252/502 |
| 2012/0328956 A1* | 12/2012 | Oguni | H01M 4/625 |
| | | | 429/232 |
| 2013/0130153 A1 | 5/2013 | Suzuki et al. | |

FOREIGN PATENT DOCUMENTS

| | | |
|---|---|---|
| KR | 2013-0074342 A | 7/2013 |
| WO | 2015/074752 A1 | 5/2015 |

* cited by examiner a)  b)

BIPOLAR PLATE FOR ELECTROCHEMICAL CELLS AND METHOD FOR THE PRODUCTION THEREOF

BACKGROUND OF THE INVENTION

The invention relates to a coated bipolar plate for electrochemical energy converters, such as is typically used for fuel cells and/or electrolysis cells. The invention furthermore relates to a method for producing the coated bipolar plate according to the invention.

An electrochemical energy converter (such as a fuel cell or an electrolytic cell) comprises two electrodes (anode and cathode), which by means of a solid semipermeable electrolyte membrane or a liquid electrolyte in an inert fiber structure are disposed in an electrically insulated and mechanically separated manner and form what is known as a membrane electrode assembly (MEA). In fuel cells, the oxidation reaction takes place at the anode and the reduction reaction takes place at the cathode, the opposite being true for electrolyzers. Depending on the cell type, ion-conducting polymer membranes, solute lyes or acids, alkali carbonate melts or ceramics may serve as the electrolyte. A porous electrically conductive gas diffusion layer made of carbon non-woven/woven fabric or metal foam abuts the electrode on both sides. Adjoining the same, an electrochemical energy converter comprises a bipolar plate (also referred to as flow distributor or current collector) on both sides, which are usually made of electrically conductive carbon composite materials or metals.

The focus is on fuel cells or electrolyzers that are operated by way of a solid polymer electrolyte membrane. A distinction is made between low-temperature polymer electrolyte fuel cells/electrolytic cells, which are operated at approximately 85° C., and high-temperature polymer electrolyte fuel cells/electrolytic cells, which operate in the temperature range between 120° C. and 180° C. In both variants, a proton-conducting or hydroxide ion-conducting ionomer membrane serves as the electrolyte. This is gas-tight and not electron-conducting. Adjoining the same, a catalyst layer (electrode), a porous gas diffusion layer and a bipolar plate are each provided on both sides. On the electrode surface, three phases (a catalyst serving as the electron conductor, an ionomer serving as the proton conductor and a reactant) are always in contact. The reactants (which are hydrogen and oxygen in the fuel cell and water in electrolytic cells) are fed via the flow field of the bipolar plates and homogeneously distributed across the catalyst surface by way of the porous gas diffusion layer. The role of the bipolar plate is to mechanically stabilize the electrochemical cell, supply and remove reactants on both sides, and withdraw the generated electrical current.

Bipolar plates must therefore be mechanically stable because, as they serve as the mechanically supporting element inside fuel cells and electrolyzers, they must withstand thermal expansion, high pressing pressure and, in mobile applications, vibrations and oscillations. Bipolar plates must also have high electrical and thermal conductivity so as to efficiently withdraw the generated electrical current and give off thermal energy to the cooling medium. For this purpose, they must have dense surface properties, so as not to take up any reactants or electrolyte and so as to separate these spatially from the cooling medium. Moreover, they regulate the water content (supply of water in the case of electrolyzers, and discharge of water in the case of fuel cells). Additionally, high stability with respect to electrochemical corrosion at high temperatures and an external potential is required. Among other things, the bipolar plates must withstand concentrated phosphoric acid at temperatures up to 180° C. and electrochemical potentials up to approximately 2.2 V (vs. reversible hydrogen electrode). The electrochemical corrosion at the bipolar plate/electrolyte phase boundary represents the decisive criterion in the material selection for bipolar plates.

At present, the use of graphite-polymer composites represents the state of the art, both for low-temperature and for high-temperature applications. These are organic polymers, such as polypropylene, polyphenylene sulfide, phenolic and vinyl ester resins comprising carbon black or graphite particles, which exhibit a considerable improvement in robustness and in mass production by way of injection molding processes or hot pressing, compared to pure graphitic materials.

While the polymer matrix of such graphite-polymer composites improves the mechanical stability due to elastic properties, this comes at the expense of electronic and thermal conductivity, since the polymer fractions have an insulating effect. Moreover, graphite-based bipolar plates have a relatively high material thickness (>2 mm).

This is where the enormous advantages of metallic bipolar plates come in. In general, these can be generated using simple and inexpensive production methods, such as stamping or high-pressure forming. Furthermore, they exhibit good ductility and considerably higher mechanical stability against impact and vibrations, which frequently present the problems of causing cracks and, as a consequence, loss of gases. Moreover, they have sufficiently high electronic and thermal conductivity for use in a fuel cell or in an electrolyzer.

One significant challenge of metallic bipolar plates, for which the possibility of a broad introduction into fuel cell technology had previously been denied, is the susceptibility of the metallic materials used in bipolar plates to corrosion in a moist acid/alkaline environment.

While moderate corrosion conditions (electrolyte concentration <0.5 M $H_2SO_4$ at ~85° C.) are present in low-temperature fuel cells/electrolyzers, more drastic conditions prevail in high-temperature fuel cells/electrolyzers due to the concentrated phosphoric acid (up to 16 M) used and the high temperature of up to 180° C. This causes the metallic bipolar plates to corrode upon contact with the electrolyte, and the released metal ions can disadvantageously poison the polymer electrolyte membrane (Nafion® or polybenzimidazole membrane). The decrease in proton conductivity as a result of the intercalation of metal ions has already been examined in the low-temperature application using Nafion® membranes. Another occurrence of corrosion is the formation of non-conducting or insufficiently conductive passivation layers (metal oxides, metal hydroxides, metal phosphates) on the metal surface of a bipolar plate, which are accompanied by a rise in the electrical contact resistance. This has also already been examined in-depth for sulfuric acid conditions (Nafion® membrane). In addition to the high operating temperature, the electrochemical potential is also a decisive factor influencing corrosion. Potentials of approximately 1 V can occur in fuel cells, and in electrolyzers they can even be as high as 2.2 V (vs. reversible hydrogen electrode).

The aforementioned disadvantages of corrosion can be reduced by applying resistant and electronically conductive coatings to the metallic bipolar plate. Coatings known thus far are, for example, ceramic nitrides and carbides based on titanium, chromium, aluminum, silicon or zirconium, graphitic or gold-based coatings, produced by way of physical or chemical vapor deposition (PVD/CVD). From the literature, electrochemical deposition processes of metal borides (such as NiCoB, $Ni_2B$ or $Ni_3B$), gold or conductive organic polymers, such as polyaniline or polypyrrole, are also known. The constant difficulty encountered with all coating options is to produce defect-free layers that offer high long-term stability. Even minute defects such as cracks or pinholes cause the electrolyte to spread beneath the electrolyte and result in corrosion damage.

Another option is to plate stainless steel, serving as the bipolar plate material, with a thin niobium layer, which forms stable and electronically conducting oxide layers and thereby passivates the metal.

In principle, not only the chemical and electrochemical stability, but also the electrical conductivity and the thermal coefficient of expansion between the metallic bipolar plate material and the applied coating material must be considered in the selection of coatings, so as to avoid surface cracks.

Bipolar plates in polymer electrolyte fuel cells are subject to electrochemical corrosion due to the acid environment and the influence of the temperature and electrochemical potential. Only precious metals, such as gold, or very rare and expensive metals, such as tantalum, which forms a stable and conductive oxide layer under the above-described conditions, can be used for conditions this drastic. Inexpensive stainless steels and nickel base alloys, in contrast, have excessively high corrosion rates and/or form non-conductive passive layers. This results in a relatively rapid decrease in performance and the disadvantage of aging of the fuel cell.

So as to still be able to utilize the decisive advantages of metallic bipolar plates, a cost-effective corrosion-resistant and electronically conductive coating and a coating method suitable for mass production are needed.

SUMMARY OF THE INVENTION

It is the object of the invention to provide a further metallic bipolar plate for low-temperature or high-temperature polymer electrolyte fuel cells/electrolyzers which, as the result of suitable coating, is inexpensive to produce, sufficiently stable and corrosion-resistant, and moreover has the necessary electronic and thermal conductivities for use in an electrochemical energy converter.

It is a further object of the invention to provide a method for producing the aforementioned metallic bipolar plate for use in a low-temperature or high-temperature polymer electrolyte fuel cell/electrolyzer.

The objects of the invention are achieved by a bipolar plate according to the main claim and by a method for the production thereof according to the additional independent claim. Advantageous embodiments of the bipolar plate or of the production method can be found in the dependent claims.

The core idea of the invention is to provide a metallic bipolar plate with a coating, comprising at least partially reduced graphene oxide layers (GO), which represents effective corrosion protection for metallic materials and moreover allows a simple and cost-effective coating method.

Suitable materials for such a bipolar plate include all metallic materials previously customary for bipolar plates, comprising iron-based steels, austenitic stainless steels and alloys having a high content of chromium, nickel and/or molybdenum and additions of niobium, titanium and/or copper, manganese, tungsten, tantalum and vanadium, copper alloys, and precious metals, such as gold and platinum.

It has been found that coating with a graphene-like material, which is composed of one or more at least partially reduced graphene oxide layers, is a promising option for reducing the corrosion of metallic materials. Such a coating advantageously has sufficient stability and the necessary electrical conductivity for use in an electrochemical cell.

Graphene is generally understood to mean a monolayer of carbon, which is present two-dimensionally in a plane and hexagonally cross-linked. Graphite, in contrast, is present in a three-dimensional structure composed of parallel extending, planar layers made of graphene. Both graphene and graphite are electrically conductive.

Graphite oxide is a non-stoichiometric compound made of carbon, oxygen and hydrogen. When graphite oxide is dissolved in a polar solvent and treated with ultrasound, a homogeneous colloidal suspension of flakes made of non-conductive monomolecular layers (graphene oxide) is obtained.

Chemical synthesis is carried out to produce the coating according to the invention comprising one or more at least partially reduced graphene oxide layers. Proceeding from graphite powder, a graphite oxide powder is initially produced, which is subsequently converted into a stable graphene oxide (GO) suspension by way of ultrasonic dispersion. Such a suspension is referred to as being stable when it shows no sedimentation even after more than 30 days.

By depositing this suspension on a metallic carrier substrate, individual thin graphene oxide layers can then be applied and subsequently be reduced to obtain at least partially reduced graphene oxide (rGO), which hereafter is referred to as graphene-like material.

The oxygen content in graphene oxide is in the order of magnitude of 20 to 60 wt. %, and in particular between 25 wt. % and 50 wt. % (the remainder being carbon) and, depending on the reduction conditions, can be considerably reduced in the graphene-like material following the reduction. Reduction by more than 50% is advantageous, and in particular by approximately 75%. The at least partial reduction of the graphene oxide produces graphene in the coating, which is referred to within the scope of the present invention as at least partially reduced graphene oxide (rGO), and the material of the coating is referred to as being graphene-like. The reduction of the oxygen content can be easily checked by way of an XPS measurement, wherein the decrease in intensity of the C—OH and C═O peaks can be regarded as a measure of the reduction of the graphene oxide to obtain graphene.

The layer thicknesses of the individual deposited graphene oxide layers vary depending on the application, deposition method, and concentration of the GO suspension, and generally range between 10 nm and 1 µm. In particular, spray, dip or spin coating methods are suitable for deposition.

Advantageously, the coating and reduction steps take place alternately, in several consecutive method steps, until the desired layer thickness is achieved.

If only coating steps up to the desired layer thickness were to be performed first, the subsequent reduction would have been performed down to larger layer depths, which is typically difficult to implement. Depending on the desired layer thickness, the GO concentration during the spray method is typically 0.5 to 5 mg/ml, and during dip and spin coating it is approximately 5 to 10 mg/ml. The required layer thickness can vary depending on the general conditions for use in low-temperature or high-temperature polymer electrolyte fuel cells/electrolyzers.

All previously known reduction methods (thermal, chemical, electrochemical and laser-induced) may be used for the at least partial reduction of the applied graphene oxide.

Thermally reduced graphene oxide is also abbreviated hereafter as trGO. As a result of the at least partial reduction, the graphene oxide layers advantageously become sufficiently electrically conductive for use in a bipolar plate. Sufficiently conductive shall be understood to mean an electrical conductivity of at least 50 S/cm, and preferably of more than 100 S/cm.

In fuel cells/electrolyzers, the contact resistance between the bipolar plate and the abutting gas diffusion layer is of decisive importance. Metallic surfaces build up passive layers, which drastically lower the electrical conductivity, when exposed to atmospheric oxygen and upon contact with aqueous and oxygen-containing solutions. This passivation effect results in a significant decrease in performance in fuel cells and electrolyzers when using uncoated metallic materials.

A decisive parameter for coating a bipolar plate with a graphene-like material in accordance with the invention is thus the contact resistance at the boundary between the bipolar plate and the gas diffusion layer. Precious metals such as gold or platinum show very low contact resistances, since they are not subject to any surface passivation. Precious metals, however, are generally not suitable bipolar plate materials for cost reasons. In cost-effective stainless steels and nickel- and chromium-based alloys, the contact resistance has an enormous influence on the performance of fuel cells and electrolyzers.

Furthermore, the metallic bipolar plate is spatially shielded from a chemical electrolyte attack by the at least partially reduced graphene oxide coating. This requires the reduced graphene oxide coating to be free from defects, such as cracks or pinholes. In low-temperature fuel cells and electrolyzers, operating temperatures are typically 80 to 90° C., and a, aqueous sulfuric acid environment (generally <0.5 M $H_2SO_4$) is present. In high-temperature fuel cells and electrolyzers, higher operating temperatures of 120 to 180° C. and acidity levels of ~16 M $H_3PO_4$ are present. It was found that the "graphene-like" coating according to the invention of the bipolar plate is stable with respect to the aforementioned temperatures and the ambient acid conditions.

In addition to the chemical corrosion stability with respect to the corrosive electrolyte, the at least partially reduced graphene oxide coating also exhibits high electrochemical stability at external potentials up to 1 V in fuel cells and 2.2 V in electrolyzers. Described potential values are measured against a reversible hydrogen electrode as the reference standard. The decrease in anodic corrosion current densities at an external potential as a result of the reduced graphene oxide coating according to the invention is a decisive improvement over previously customary graphitic composite materials, uncoated metallic materials, and coating concepts known from the literature.

Moreover, the at least partially reduced graphene oxide coating according to the invention has higher coefficients of expansion than graphitic and ceramic coating designs known from the literature. At the above-described operating temperatures of fuel cells and electrolyzers, the metallic bipolar plate undergoes a measurable material expansion which, in rigid and inelastic coatings, can disadvantageously result in cracks and chipping. This necessarily results in the occurrence of corrosion, a rise in the contact resistance, and consequently in a decrease in cell performance. The high modulus of elasticity of the at least partially reduced graphene oxide layers according to the invention typically prevents the temperature-dependent degradation of the coating. Bending tests of coated metallic substrates moreover showed that no defects (cracks and chipping) of the at least partially reduced graphene oxide coating can be observed even during bending of up to 45°.

Materials that may be used for a suitable metallic bipolar plate include all previously customary metallic materials, comprising iron-based steels, austenitic stainless steels and alloys having a high content of chromium, nickel and/or molybdenum and additions of niobium, titanium and/or copper, manganese, tungsten, tantalum and vanadium, copper alloys, and precious metals, such as gold and platinum.

The graphene-like coating according to the invention produced on the metallic bipolar plate advantageously has very good adhesion on the metallic material of the bipolar plate. Furthermore, it was found that this coating is advantageously flexible. Moreover, the corrosion resistance in acidic or basic media, at high temperatures and electrical/electrochemical potentials, can be considerably increased compared to an uncoated metallic bipolar plate.

Since the graphene-like coating according to the invention also has sufficiently good electrical conductivity, it may advantageously be employed as a promising coating for metallic bipolar plates for use in fuel cells and electrolyzers, which is to say in electrochemical cells in general. This opens up completely new design options, which cannot be applied to graphitic materials. Since metallic bipolar plates generally have a material thickness of ~100 μm (compared to graphitic composite materials >2 mm), a fuel cell stack/electrolytic stack with considerably higher gravimetric and volumetric power densities can be achieved by way of the graphene-like coating according to the invention.

Moreover, the graphene-like coating according to the invention can be generated by way of the aforementioned coating method which, compared to known alternative coating techniques, such as the complex physical or chemical vapor deposition method, is considerably simpler and more cost-effective.

Advantageously, the graphene-like coating according to the invention is not only limited to the use in electrochemical cells. Further applications of the graphene-like coating according to the invention are, in general, the coating of metallic components at risk of corrosion, such as pipelines, ship hulls, vehicle bodies, metallic electrochemical and chemical reactors, and the like, or of steel components in buildings, and in particular on bridges and similar structures.

The object of the invention will be described hereafter in more detail by way of example, referring to several figures of bipolar plates, without thereby limiting the subject matter.

The requirements placed on a bipolar plate for use in an electrochemical cell are high chemical and electrochemical stability in the environment of the cell, sufficient electronic and thermal conductivity, high ductility, and the possibility of mass production.

DETAILED DESCRIPTION OF THE INVENTION

Figure 1:
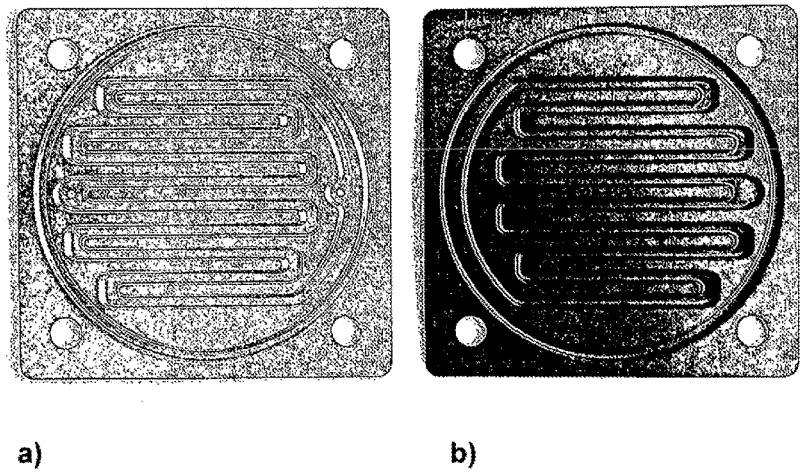
FIG. 1a) shows a metallic bipolar plate not having a coating according to the invention.
FIG. 1b) shows a metallic bipolar plate having an at least partially reduced coating according to the invention.

FIG. 1 a) shows a metallic bipolar plate (material 1.4404, which is an austentitic stainless steel) having an embossed flow field without the reduced graphene oxide coating according to the invention.

In contrast, FIG. 1 b) shows a metallic bipolar plate (material 1.4404) having an embossed flow field comprising an at least partially reduced graphene oxide coating according to the invention. This was applied by way of a spray method using an aqueous graphene oxide suspension having a concentration of 2 mg/ml. The reduction to obtain the reduced graphene oxide layers was carried out thermally, on a heating plate at temperatures up to 500° C. After every spraying operation, the currently applied layer was thermally reduced before the next coating process was carried out. The overall coating thickness of this bipolar plate is 250 nm.

Figure 2:
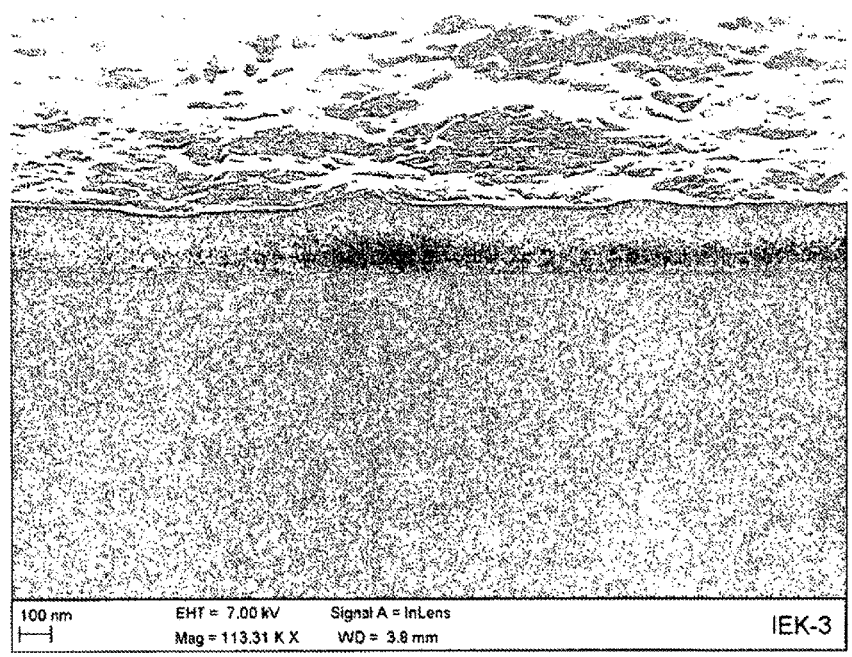
FIG. 2 shows a cross-section of a metallic bipolar plate having a graphene-like coating according to the invention.

FIG. 2 shows a cross-section of the metallic bipolar plate (material 1.4404) comprising the graphene-like coating according to the invention. The application and reduction methods (thermally reduced) were analogous to FIG. 1. The overall coating thickness is also 250 nm here. Cross-sections were prepared by way of an ion polishing technique.

Figure 3:
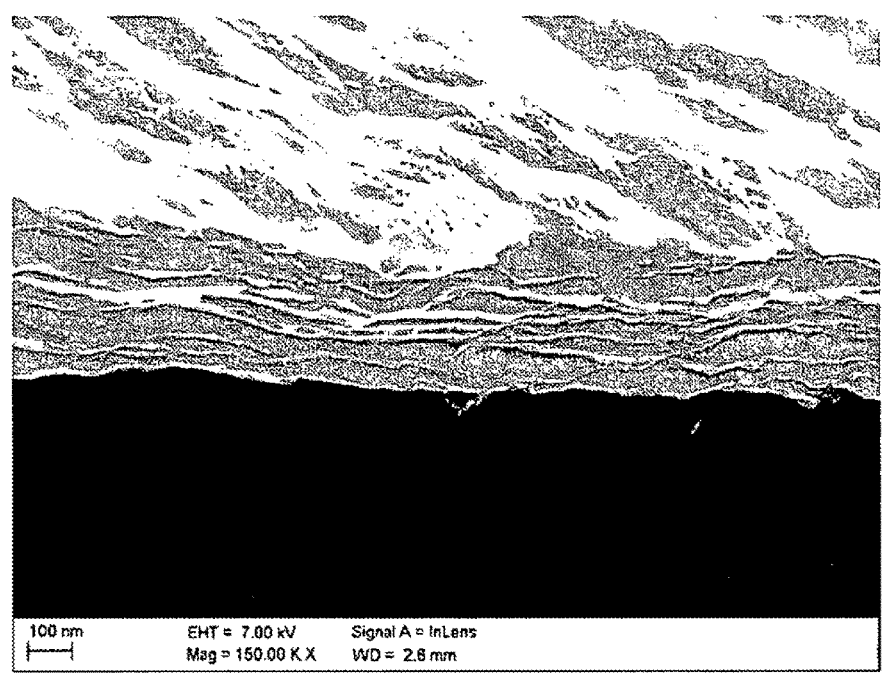
FIG. 3 shows a cross-section of a metallic bipolar plate having a thermally reduced graphing oxide coating according to the invention.

FIG. 3 shows a cross-section of the metallic bipolar plate (material 1.4404) comprising a thermally reduced graphene oxide coating according to the invention. The application and reduction methods are comparable to those of FIG. 1. The layer thickness here is approximately 250 nm. The cross-section was prepared using a scalpel cut. The layer composition of individual reduced graphene oxide layers is clearly apparent.

Figure 4:
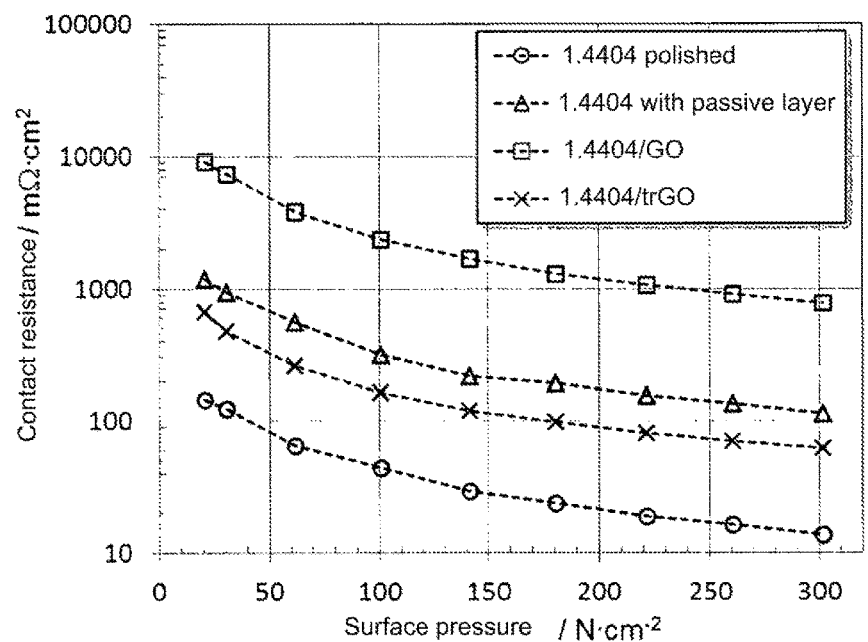
FIG. 4 shows the contact resistance between uncoated and coated bipolar plates and and abutting gas diffusion layer as a function of the pressing pressure.

FIG. 4 shows the contact resistance between uncoated and coated bipolar plates and the abutting gas diffusion layer (carbon non-woven) as a function of the pressing pressure. The thermally reduced graphene oxide coating according to the invention on material 1.4404 (trGO/1.4404) having a layer thickness of 200 nm advantageously shows a reduction in the contact resistance by more than one order of magnitude compared to a non-reduced graphene oxide coating on 1.4404 (GO/1.4404). For comparison, the contact resistance of an uncoated bipolar plate made of material 1.4404 comprising a surface passivation layer formed naturally when exposed to atmospheric oxygen and a mechanically ablated (polished) surface is shown. The material sample 1.4404 was measured directly after the mechanical polishing step. However, since the surface passivation takes place within a few hours when exposed to atmospheric oxygen or in aqueous oxygen-containing solutions, the material sample 1.4404 comprising the passivation layer shows the contact resistances in fuel cells or electrolyzers to be expected during operation.

The contact resistance of thermally reduced graphene oxide layers on material 1.4404 (trGO/1.4404) having a layer thickness of ~100 nm decreases by more than one order of magnitude compared to unreduced graphene oxide layers (GO/1.4404) following the thermal reduction from 1700 m$\Omega$ cm$^2$ to 120 m$\Omega$ cm$^2$ at a pressing pressure of 140 N cm$^2$, and from 775 m$\Omega$ cm$^2$ to 62 m$\Omega$ cm$^2$ at a pressing pressure of 300 N cm$^2$. The contact resistance of trGO/1.4404 is even lower than that of the uncoated material 1.4404 passivated by exposure to atmospheric oxygen. It has been shown that contact resistances <100 m$\Omega$ cm$^2$ are necessary during fuel cell operation. This specification can be achieved for the thermally reduced graphene oxide layers generated according to the invention on a bipolar plate.

Figure 5:
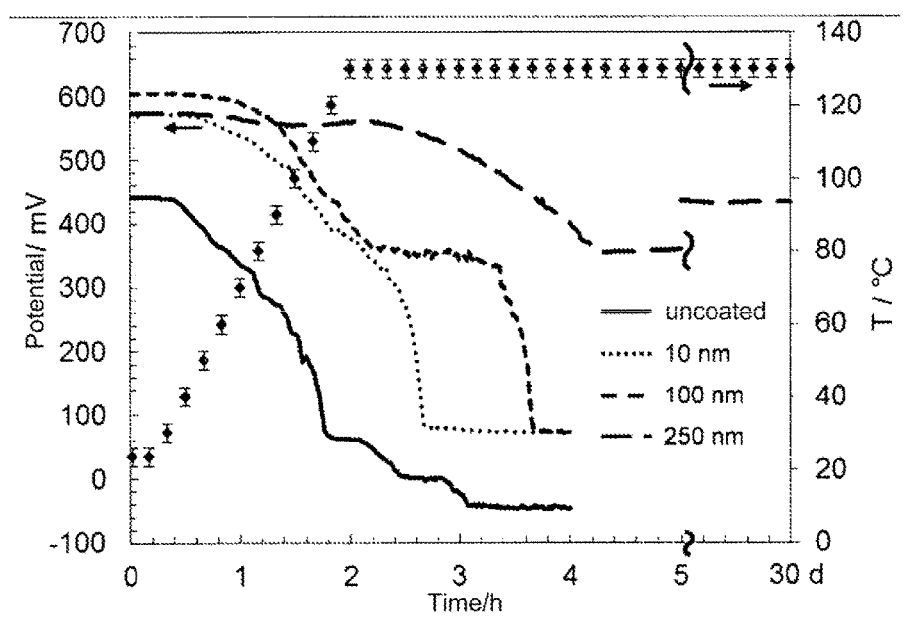
FIG. 5 shows the progression of the free corrosion potential during a temperature increase to 130° C. in a long-term experiment lasting 30 days.

FIG. 5 shows the progression of the free corrosion potential during a temperature increase to 130° C. in a long-term experiment lasting 30 days. The experiment was carried out in a three-electrode measuring cell in 175 ml 85 wt. % H$_3$PO$_4$. Rapid degradation of the passive layer is apparent on the uncoated material 1.4404, which is accompanied by a drop in the free corrosion potential as the temperature rises. The temperature increase is shown in the diagram by rhombi having a temperature fluctuation of 5° C. The at least partially thermally reduced graphene oxide coatings on material 1.4404 having a thickness of 10 nm and 100 nm show only minor improvement under these drastic conditions. In contrast, thermally reduced graphene oxide layers having a thickness of approximately 250 nm have a corrosion potential of 435 mV (vs. reversible hydrogen electrode) even after 30 days. This is an indication that the metal surface of the bipolar plate beneath the coating is effectively protected against acid attack. Under real fuel cell/electrolysis conditions, in general a considerably lower amount of electrolyte (~1 mg/cm$^2$) is in contact with the bipolar plate, so that lower layer thicknesses are sufficient in these instances to protect the metal substrate against corrosion.

As another experiment, a potentiodynamic corrosion test was carried out in 175 ml 1 M H$_3$PO$_4$ at room temperature in an electrochemical three-electrode measuring cell. After 100 cycles in the potential range of 0 to 1.3 V (vs. reversible hydrogen electrode) using a scan rate of 100 mV/s, an uncoated copper sample having a thickness of 100 µm (serving as a potential bipolar plate material) had completely dissolved, while a copper sample coated with at least partially thermally reduced graphene oxide (trGO) (as one embodiment of a bipolar plate according to the invention) only showed minor defects in the edge regions. This effect can be explained by the fact that, among other things, the sealing ring had damaged the thermally reduced graphene oxide coating during disassembly of the measuring cell.

To produce the graphene oxide (GO) suspension, the chemical synthesis described hereafter was carried out. Functionalization of graphite with hydrophilic groups (epoxy, hydroxy and carboxy groups, among other things) with subsequent ultrasonic dispersion ensures a stable graphene oxide (GO) suspension, which is reduced after the coating process, as was already described above. The aromatic system is restored as a result of the elimination of the hydrophilic groups.

Exemplary Synthesis (Synthesis According to Variation of Hummers' Method):

Charge graphite in a round-bottomed flask, mix it with 400 ml H$_2$SO$_4$/H$_3$PO$_4$ (360/40 ml) and stir. Then, slowly add KMnO$_4$ in portions, so that the temperature remains relatively constant. Cool in an ice bath, since the reaction is highly exothermic. Thereafter, control the temperature to 50° C. and stir for 18 hours. Afterwards, allow to cool to room temperature and place 500 ml on ice. Then, add 7 ml 27% H$_2$O$_2$. Thereafter, centrifuge the graphite oxide powder thus obtained, wash several times with ethanol and water, and dry. This is followed by the direct ultrasonic dispersion of the graphite oxide powder by way of a sonotrode in a protic polar solvent (60 minutes per 100 ml suspension at 1 mg/ml concentration, using an intensity of approximately 100 W/cm$^2$ sonotrode surface). Lastly, centrifuge again and dry (product is graphene oxide particles). It is possible to directly coat the substrate in the form of a suspension.

The at least partial reduction of the graphene oxide to obtain graphene takes place in a simple embodiment of the method in a furnace or on a heating plate, preferably in an inert gas atmosphere (nitrogen, argon) or by exposure to atmospheric oxygen in the temperature range of 200 to 500° C. As a result of the supply of thermal energy, functional groups are reduced ($CO/CO_2$ escapes) and the aromatic system is restored. This was confirmed by way of thermogravimetric analyses (TGA). Checking with XPS spectroscopy, it is further possible to clearly distinguish whether the coating applied to a bipolar plate comprises graphene, graphite oxide or the graphene-like composition according to the invention.

Other methods for producing the graphene oxide (GO) suspension were also tested. The chemical synthesis is carried out with a strong reducing agent, such as hydrazine in solution or in the gas phase. Graphene oxide layers are reduced by way of hydrazine to obtain chemically reduced graphene oxide layers (crGO). The electrochemical reduction of graphene oxide layers to obtain electrochemically reduced graphene oxide layers (erGO) took place in an electrolyte (such as potassium dihydrogen phosphate) in the cathodic polarization range (up to −1 V vs. reversible hydrogen electrode). The disadvantage of the chemical and electrochemical reduction that should be mentioned is that a contamination of the coating with foreign ions of the reducing agent occurs. In fuel cells/electrolyzers, this may result in contamination of the polymer electrolyte membrane or of the catalyst. Laser-induced reduction takes place by the direct irradiation of the graphene oxide coating by way of a laser beam. This requires adjustments of the intensity, energy, pulse duration and the like, so as to achieve an effective reduction to obtain the laser-reduced graphene oxide coating (LrGO), while also avoiding damage to the coating.

Chemical and electrochemical reduction thus brings with it the disadvantages of impurities in the coating, and that partial defects are frequently caused in the case of laser reduction. Within the scope of the present invention, in particular thermal reduction is thus considered to be particularly simple and effective, and in this respect is regarded as particularly advantageous.

The invention claimed is:

1. An electrochemical cell, comprising a membrane electrode assembly which comprise an anode and a cathode separated by a solid semipermeable electrolyte membrane or a liquid electrolyte in an inert fiber structure, the electrochemical cell further comprising a respective porous electrically conductive gas diffusion layer made of carbon fabric or metal foam abutting respective each of the anode and the cathode, and a respective bipolar plate adjoining each respective one of the porous electrically conductive gas diffusion layers on each side of the membrane, electrode assembly, wherein each bipolar plate is a metal plate having an electrically conductive graphene-like coating, the bipolar plate being produced by
applying to a metal plate, by way of a spray, dip or spin coating method, a stable suspension in which only graphene oxide is suspended to form at least one layer consisting of graphene oxide on the plate, and
subjecting the at least one graphene oxide layer to a reduction step to at least partially reduce the graphene oxide thereby to produce an electrically conductive graphene-like coating consisting of at least partially reduced graphene oxide.

2. The electrochemical cell according to claim 1, wherein each of the graphene-like coating layers has a thickness between 10 nm and 1 µm.

3. The electrochemical cell according to claim 1, wherein the graphene-like coating has an electrical conductivity of at least 50 S/cm.

4. The electrochemical cell according to claim 1, wherein the metal is selected from the group consisting of: iron-based steels; austenitic stainless steels and alloys having a high content of chromium, nickel and/or molybdenum and additions of niobium, titanium and/or copper, manganese, tungsten, tantalum and vanadium; copper alloys; gold; and platinum.

5. The electrochemical cell according to claim 1, wherein the stable suspension of graphene oxide is applied to the metal plate a plurality of times to form a plurality of graphene oxide layers and each applied graphene oxide layer is subjected to the reduction step before a next graphene oxide layer is applied.

6. The electrochemical cell according to claim 1, wherein the reduction of the at least one graphene oxide layer takes place chemically, electrochemically, induced by laser, or thermally.

7. The electrochemical cell according to claim 6, wherein the reduction takes place thermally and temperatures up to a maximum of 500° C. are used for the thermal reduction.

8. A fuel cell or electrolyzer, comprising an anode and a cathode separated by a solid semipermeable electrolyte membrane or a liquid electrolyte in an inert fiber structure, and a respective bipolar plate on each of an anode side and a cathode side of the fuel cell or electrolyzer, the bipolar plates each being configured to mechanically stabilize the fuel cell or electrolyzer and to supply and remove reactants on both said sides and to withdraw electrical current generated by the fuel cell, wherein each of the bipolar plates consists of a metallic substrate coated with thermally reduced graphene oxide, oxygen content of the thermally reduced graphene oxide is less than 30 wt. %, and the coating has a thickness of 200 to 250 nm and a contact resistance during fuel cell operation of less than 100 mΩ $cm^2$.

* * * * *